United States Patent Office 3,275,683
Patented Sept. 27, 1966

3,275,683
PROCESS FOR PRODUCING 2-PHENYLGLUTARIC ACID AND DERIVATIVES THEREOF
Henry E. Fritz, South Charleston, W. Va., assignor to Union Carbide Corporation, a corporation of New York
No Drawing. Filed Sept. 10, 1962, Ser. No. 222,690
3 Claims. (Cl. 260—515)

This invention relates to a general synthesis for substituted glutaric acid compounds. More particularly, this invention relates to the production of 2-phenylglutaric acid and related compounds.

Prior to this invention, the best known method for producing 2-phenylglutaric acid was via the cyanoethylation of an ester of phenylmalonic acid or an ester of phenylcyanoacetic acid followed by hydroylsis of the product to form a tricarboxylic acid and cleavage of one of the carboxyl groups, as disclosed by E. C. Horning et al., Org. Syn., 30, 81 (1950) and by M. F. Ansell et al., J. Chem. Soc., 1950, pp. 1683–1686. Both the phenylmalonic acid esters and the phenylcyanoacetic acid esters are difficult to obtain and, thus, these syntheses are not widely employed.

It has now been discovered that 2-phenylglutaric acid is readily produced in high yields by a novel process using readily available starting materials. Morover, the process of this invention is suitable for producing a wide range of substituted 2-phenylglutaric acids, which are represented by the formula:

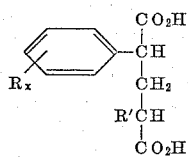

wherein R is an inert substitutent, such as alkyl radical, of from 1 to 10 carbon atoms, an alkoxy radical of from 1 to 10 carbon atoms, an aryl radical of from 6 to 10 carbon atoms, an aryloxy radical of from 6 to 10 carbon atoms, and the like; R' is a hydrogen atom, an alkyl radical of from 1 to 10 carbon atoms, or an aryl radical of from 6 to 10 carbon atoms; and $x$ is an integer having a value of from 0 to 5. As examples of compounds of this type one can mention 2-phenylglutaric acid, 2-tolylglutaric acid, 2-mesitylglutaric acid, 2-(4'-ethylphenyl) glutaric acid, 2-(4'-ethoxy-phenyl)glutaric acid, 2-(p-biphenyl) glutaric acid, 2-phenyl-4-methylglutaric acid, 2-phenyl-4-ethylglutaric acid, 2,4-diphenylglutaric acid and the like.

The process of this invention essentially comprises heating at elevated temperatures an alkali metal salt of a phenylacetic acid, an alkali metal salt of an $\alpha,\beta$-unsaturated acid, and a catalytic amount of a strong base.

The alkali metal salts of the phenylacetic acid can be represented by the formula:

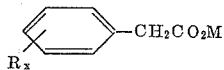

wherein M is an alkali metal, such as lithium, sodium, potassium, rubidium or cesium; and R and $x$ are as defined above. Preferred compounds are the alkali metal salts of phenylacetic acid and substituted phenylacetic acid wherein R is alkyl of from 1 to 3 carbon atoms. As examples of suitable alkali-metal phenylacetate salts one can mention lithium phenylacetate, sodium phenylacetate, potassium phenylacetate, rubidium phenylacetate, cesium phenylacetate, potassium tolylacetate, potassium mesitylacetate, potassium p-hexyl-phenylacetate, potassium p-biphenylacetate, potassium p-methoxyphenyl acetate, potassium p-phenoxyphenyl acetate, and the like.

The alkali metal salts of $\alpha,\beta$-unsaturated acids which are employed in the process of this invention are salts of acrylic acids of the formula:

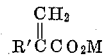

wherein R' and M are as defined above. Preferred are the alkali metal salts wherein R' is hydrogen, alkyl of 1 to 6 carbon atoms or phenyl. As examples of suitable alkali metal acrylate salts one can mention lithium acrylate, sodium acrylate, potassium acrylate, rubidium acrylate, cesium acrylate, potassium methacrylate, potassium 2-methylenebutyrate, potassium 2-methylenevalerate, potassium 2-methyleneoctanoate, potassium atropate, and the like.

The ratio of alkali metal phenylacetate to alkali metal acrylate in the reaction mixture can vary from 0.2:1, or less, to 2:1, or higher, with mole ratios of from 0.25:1 to 1:1 preferred.

As previously indicated, a strong base is employed as a catalyst for the process of this invention. The strong base can be an alkali metal hydroxide, such as lithium hydroxide, sodium hydroxide, potassium hydroxide, rubidium hydroxide, or cesium hydroxide; an alkali metal oxide, such as lithium oxide and the like; an alkali metal superoxide, such as potassium superoxide and the like; an alkali metal amide, such as sodamide and the like; an alkali metal alkoxide such as sodium methoxide, sodium ethoxide, and the like; etc. The alkali metal hydroxides are preferred, with potassium hydroxide especially preferred.

The catalytic amount of base employed in the process of this invention is at least about 0.1 mole percent, and can be as high as 75 or more mole percent, based on the total moles of alkali metal phenylacetate and alkali metal acrylate, with from about 0.1 to about 20 mole percent preferred. Smaller amounts than 0.01 percent are not recommended because the reaction rate is very slow below such concentrations. Higher amounts than 20 percent can be employed if desired, but afford no particular advantages.

As a modification of the process of this invention, the alkali metal phenylacetate and/or the alkali metal acrylate may be formed in situ by the addition of the free acid and an equimolar amount, based on the amount of free acid, of the strong base employed as the catalyst to convert the acid to its corresponding acid salt, in addition to the catalytic amount heretofore recited.

The process of this invention is conducted at temperatures of form about 150° C., or lower, to about 350° C., or higher, with temperatures of from about 190° C. to about 290° C. preferred. The reaction is normally conducted at autogenous pressures. Higher or lower pressures can be employed but afford no particular advantages.

The product of the process of this invention is the dialkali metal salt of 2-phenylglutaric acid and can be isolated as the salt or converted to the free acid by acidification according to procedures known to those skilled in the art. The acid is readily converted to its alkyl esters, such as the dimethyl ester, the bis(2-ethylhexyl) ester, and the like, or to the corresponding acid anhydride, according to methods known to those skilled in the art.

The free 2-phenylglutaric acid is useful in itself as a monomer for the production of polyesters, or it can be used as an intermediate in the production of other polymerizable monomers. For example, difunctional amino acids can be produced by nitration of the free acid or by the condensation of the free acid with acrylonitrile, followed by reduction of the nitro or nitrile group to an amino group. The amino acids can in turn be converted to hydroxy acids by diazotization of the amino group. Both the amino acids and the hydroxy acids are useful as monomers for the production of polymeric products. In addition, the alkyl esters of 2-phenylglutaric acid, such as bis(2-ethylhexyl) 2-phenylglutarate, can be employed as plasticizers for poly(vinyl chloride) and for vinyl chloride copolymers with vinyl acetate or vinylidene chloride.

The following examples are illustrative:

*Example I*

A 3-liter, stainless steel, rocker autoclave was charged with 136 grams of phenylacetic acid, 200 grams of acrylic acid, and 300 grams of potassium hydroxide. The autoclave was sealed, heated to 240° C. over 2½ hours, and maintained at 240±10° C. for 20 hours while agitating the reaction mixture by rocking. The autoclave was then cooled to room temperature, opened, and water was added to the reaction mixture. The resulting mixture was filtered to remove traces of solids and the clear, brown filtrate containing dipotassium 2-phenylglutarate was acidified with hydrochloric acid to a pH of 2. The aqueous mixture was again filtered and then extracted twice with 500-milliliter portions of isopropyl ether. After combination of the ether extracts and evaporation of the ether, 134 grams of 2-phenylglutaric acid were recovered. The 2-phenylglutaric acid was mixed with 500 milliliters of methanol and 5 grams of p-toluenesulfonic acid and was esterified by refluxing for 10 hours. The reaction mixture was then poured into 1 liter of water and the aqueous mixture was extracted twice with 100-milliliter portions of isopropyl ether. The ether extracts were combined and washed with 500 milliliters of water, then with 50 milliliters of aqueous 5 percent sodium hydroxide, and again with water until neutral (pH of 7). The ether was evaporated and the remaining liquid was vacuum distilled to recover 80 grams of dimethyl 2-phenylglutarate which boiled at 167–168° C. at 10 millimeters of mercury and had an index of refraction, $n_D^{20}$, of 1.5011.

*Microanalysis.*—Calculated for $C_{13}H_{16}O_4$: C, 66.07; H, 6.83. Found, C, 66.08; H, 6.90.

Molecular weight: Calculated: 236.26. Determined from depression of the freezing point of benzene; 237.

*Example II*

Employing procedures and apparatus similar to those described in Example I, 152 grams of 2-phenylglutaric acid were produced. The acid was vacuum distilled and 89 grams of 2-phenylglutaric anhydride were obtained which boiled at 177–182° C. at 1.0–1.6 millimeters of mercury, and melted at 95.0–95.5° C. 2-phenylglutaric anhydride is reported to boil at 178–188° C. at 0.5–1.0 millimeters mercury and to melt at 95–96° C. by E. C. Horning et al., Org. Syn., 30, 81 (1950).

In a similar manner, 2-phenyl-4-methylglutaric acid, its esters, or its anhydride are produced by substituting methacrylic acid for acrylic acid; 2-phenyl-4-pentylglutaric acid, its esters, or its anhydride are produced by substituting 2-methyleneheptanoic acid for acrylic acid; and 2,4-diphenylglutaric acid, its esters, or its anhydride are produced by substituting atropic acid for acrylic acid.

What is claimed is:

1. The process for producing a 2-phenylglutaric acid of the formula:

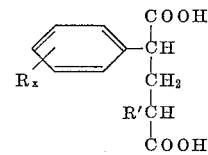

wherein R is a member selected from the group consisting of alkyl of from 1 to 10 carbon atoms, alkoxy of from 1 to 10 carbon atoms, aryl of from 6 to 10 carbon atoms and aryloxy of from 6 to 10 carbon atoms; R' is a member selected from the group consisting of hydrogen, alkyl of from 1 to 10 carbon atoms and aryl of from 6 to 10 carbon atoms; and $x$ is an integer having a value of from 0 to 5; which comprises reacting at 150° C. to 350° C. a mixture of an alkali metal phenylacetate, an alkali metal acrylate of the formula:

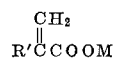

wherein M is an alkali metal atom, and a catalytic amount of an alkali metal hydroxide.

2. The process for producing alkali metal 2-phenylglutarate which comprises heating at 150° C. to 350° C. a mixture of alkali metal phenylacetate, alkali metal acrylate and a catalytic amount of an alkali metal hydroxide.

3. The process for producing dipotassium 2-phenylglutarate which comprises heating at 150° C. to 350° C. a mixture of potassium phenylacetate, potassium acrylate, and a catalytic amount of potassium hydroxide.

References Cited by the Examiner

UNITED STATES PATENTS 2,824,120  2/1958  Buckley et al. _____ 260—515 X

LORRAINE A. WEINBERGER, *Primary Examiner.*

LEON ZITVER, *Examiner.*

R. E. MASSA, T. L. GALLOWAY, *Assistant Examiners.*